United States Patent [19]
Japp et al.

[11] 3,920,061
[45] Nov. 18, 1975

[54] PNEUMATIC TIRE AND WHEEL ASSEMBLIES

[75] Inventors: Michael Peter Japp; Geoffrey Lionel Coulter, both of Sutton Coldfield, England

[73] Assignee: Dunlop Limited, England

[22] Filed: July 3, 1973

[21] Appl. No.: 383,470

[30] Foreign Application Priority Data
July 29, 1972 United Kingdom............ 35577/72

[52] U.S. Cl.......... 152/330 RF; 152/330 L; 152/347
[51] Int. Cl.²................. B60C 17/00; B60C 21/08
[58] Field of Search .......... 152/158, 362, 339, 340, 152/346, 347, 330 RF, 330 L; 252/28

[56] References Cited
UNITED STATES PATENTS

| | | |
|---|---|---|
| 2,752,979 | 7/1956 | Knill et al. ........................ 152/347 |
| 2,802,505 | 8/1957 | Peterson et al. ................... 152/347 |
| 2,811,190 | 10/1957 | Iknayan et al. .................... 152/347 |
| 3,042,098 | 7/1962 | Reinowski et al. ................ 152/347 |
| 3,110,669 | 11/1963 | Borg .................................. 252/28 |
| 3,433,743 | 3/1969 | Morway et al. .................... 252/28 |
| 3,536,621 | 10/1970 | Christian ........................... 252/28 |
| 3,628,585 | 12/1971 | Pace .................................. 152/347 |
| 3,739,829 | 6/1973 | Powell et al. .................. 152/330 RF |

*Primary Examiner*—Drayton E. Hoffman
*Attorney, Agent, or Firm*—Stevens, Davis, Miller & Mosher

[57] ABSTRACT

A pneumatic tire and wheel assembly containing a lubricant composition for lubricating the internal surfaces of the assembly when in use in a deflated or substantially under-inflated condition. The composition includes a volatile component to at least partially reinflate the assembly and a puncture sealing material comprising a shredded and/or ground plastics material. A lubricant composition is also included.

16 Claims, 6 Drawing Figures

PNEUMATIC TIRE AND WHEEL ASSEMBLIES

This invention relates to pneumatic tire and wheel assemblies and particularly to the sealing of punctures in the tire thereof.

Upon partial or complete deflation of a pneumatic tire mounted on a wheel during the running of a vehicle opposite surfaces in the interior of the tire and wheel assembly come into contact with one another under more or less load according to whether or not the deflation is complete; the regions of the interior surfaces which normally come into contact are the interior surfaces of the tire close to but radially outwardly of the rim flanges and the interior surface of the tire close to but laterally inwardly of the tread edge.

When the surfaces come into contact considerable heat is generated within the rubber and textile components of the tire and very rapid structural failure ensues.

This difficulty may be reduced or obviated by the use of lubricant as described in the assignee's U.S. Pat. No. 3,739,829. As mentioned in this specification it is desirable to seal the puncture if possible in order that some internal pressure may be reestablished e.g. by vaporization of one or more components of the lubricant.

According to the invention there is provided a pneumatic tire and wheel assembly containing a lubricant composition for lubricating the internal surfaces of the assembly when in use in a deflated or substantially underinflated condition, said lubricant composition including a volatile component to at least partially reinflate the tire and a puncture sealing material comprising a shredded and/or ground plastics material. Preferably the plastics material has a density relative to that of the composition in the range 0.7 to 1.3.

According to a further aspect of the invention there is provided a lubricant composition, for lubricating the internal surfaces of a tire and wheel assembly, which includes a volatile component to at least partially reinflate the tire and a puncture sealing material comprising a shredded and/or ground plastics material. Preferably the plastics material has a density relative to that of the composition in the range 0.7 to 1.3.

In use of the lubricant composition, the puncture sealing material is to seal a puncture in the tire of a tire and wheel assembly and the volatile ingredient vaporises due to the heat generated by flexure and friction within the assembly and thereby cause partial reinflation of the tire.

Preferably the shredded plastics material comprises low density polyethylene. The preferred maximum size of the shredded polyethylene is that size of particle which will just pass through a sieve having approximately 3mm apertures but more preferably the material should be a blend of particle sizes from about 1.7 mm. (10 mesh sieve: B.S. 410 published 1969) down to fines e.g. about 100 microns. The preferred thickness of the polyethylene is 75 microns, although other thicknesses may be used.

Preferably the ground plastics material comprises polystyrene foam of the same particle size range as the shredded polyethylene.

The shredded and/or ground plastics material may advantageously be used in combination with nylon fibers which are preferred to have a length of 1 to 3 mm. and a denier in the range 1 to 6. In a further alternative the shredded and/or ground plastics material may be used in combination with vulcanized rubber in shredded or ground form and having a size range similar to that of the plastics material.

The plastics material may be loose within the inflation chamber, formed by the tire and wheel assembly while the remainder of the lubricant composition is held in an enclosing means. Alternatively the plastics material may be loose within the inflation chamber together with one or more other ingredients of the lubricant composition. In the latter case it is preferable to enclose at least the volatile ingredient of the lubricant composition when provided, to minimize loss of that ingredient. One particularly convenient form of this latter case is a lubricant composition comprising a gel ingredient in which the puncture sealing material is carried and an enclosed dilatant ingredient. The dilatant ingredient can be either enclosed with or separately from the volatile ingredient.

In a further alternative embodiment the plastics material may be enclosed with the lubricant in enclosing means such as are disclosed in U.S. application 150,627 filed June 7, 1971.

In a still further alternative embodiment when the plastics material is of, for example, foamed polyurethane the material may be applied to the interior surface of the tire, preferably in the regions of the interior surface which contact on deflation, in strip form, e.g. the strip may be stuck to the interior surface of the tyre by adhesive. Upon deflation of the tire and wheel assembly, the strip will be ground up between the interior surfaces of the tire.

Examples of lubricant compositions which may contain the puncture sealing materials of the present invention are given in previously mentioned U.S. Pat. No. 3,739,829.

The pneumatic tire is preferably a pneumatic tire of relatively low aspect ratio e.g. 50 to 75 per cent having a tread supported by a breaker assembly, and preferably also a radial ply carcass. Advantageously the tire may also have a tread wider than the distance between its bead heels when mounted on the rim in the tire/wheel assembly.

Preferably the tire is of the type described in the assignee's co-pending Pat. application 290,814 filed Sept. 31, 1972 in which the stiffness of the tread and sidewall structure together with the width of the tread is such that when in use with the tire deflated or substantially deflated and subject to a substantial lateral force one of the said sidewalls will be placed under tension in the region of the contact patch to restrain the bead from lateral movement while the other sidewall will be disposed in a folded state in the said region so as to be capable of acting as a buffer between a flange on a wheel rim on which the tire is mounted and a road surface. It is important in the use of such a tire that the beads should remain in the bead seats when the tire is deflated and should not be able to fall into a well on the wheel rim. Thus either a rim without a well should be used, e.g. a split rim or a rim in which the well has been closed up by axial compression after the tire mounting has been facilitated, or restraining means should be provided to prevent either bead falling into a well, e.g. a bead spacer ring, spacer units or projections on the wheel rim.

Example of lubricant compositions used in conjunction with the puncture sealing material and the results obtained therefrom are given below:-

EXAMPLE

A round hole was drilled with a 3/64 inch (1.19 mm) drill in the center groove of an uninflated new 185-6-0-13 tire on a split rim 3½ inches wide between flanges. To ensure that the inside of the hole was uniform and not partially blocked a red-hot thin wire was pushed through several times from outside. The valve insert was removed and the following materials were inserted through the valve hole:

| | | |
|---|---|---|
| Liquid | 300 ml blend consisting of | |
| | Ucon 50-HB-5100 X ex Union Carbide | 231 ml |
| | Water | 46 ml |
| | 74 over proof ethyl alcohol | 23 ml |
| Solids | Polythene film, 75 microns thick shredded (chopped up) into pieces of varying particle size but all having passed through a British Standards Institute test sieve of aperture size 1.70 mm (Ref. BS 410). | 15 g |
| | Nylon fibers, 1 mm long, denier 3 | 1.5 g |

The valve insert was then replaced but the tire was left deflated to simulate the situation just after a puncture. The car (Ford Escort) was now driven at approximately 50 mph up and down a straight length of track, cornering at each end alternately right and left. The car was stopped at intervals, the pressure was recorded and the puncture hole was examined for leakage.

| Distance | Pressure | Leakage |
|---|---|---|
| 2 miles | 1.5 psi | None |
| 5 miles | 3 psi | None |
| 10 miles | 4 psi | Slight |
| 20 miles | 4 psi | None |
| 30 miles | 4.5 psi | Slight |
| 40 miles | 4.5 psi | Slight |

The car was now left overnight and the testing recommenced next day.

| Distance | Pressure | Leakage |
|---|---|---|
| 42 miles | 2.5 psi | None |
| 45 miles | 4 psi | None |
| 50 miles | 5 psi | None |

A sharp metal object was now inserted through the puncture hole to break the temporary seal, and the pressure dropped to zero. The test was continued to see if sealing was re-established.

| Distance | Pressure | Leakage |
|---|---|---|
| 52 miles | 4.5 psi | Slight |
| 55 miles | 4.5 psi | Slight |
| 60 miles | 4.5 psi | None |
| 70 miles | 4.5 psi | Slight |

The sharp metal object was again inserted through the puncture hole, the tire went flat, and driving recommenced.

| Distance | Pressure | Leakage |
|---|---|---|
| 72 miles | 3 psi | Slight |
| 75 miles | 3 psi | Slight |
| 80 miles | 3.5 psi | None |

For a third time the seal was caused to break by inserting the sharp metal object through the hole and deflating the tire. Driving then continued.

| Distance | Pressure | Leakage |
|---|---|---|
| 82 miles | 1.5 psi | None |
| 85 miles | 2.5 psi | Slight |
| 90 miles | 3.5 psi | Slight |
| 100 miles | 4.5 psi | Slight |

The test was concluded after having demonstrated that a crown center hole of diameter 1.19 mm is sealable by the lubricant composition, that a small but valuable internal pressure in the tire thus sealed can be re-established and that the lubricated tire/wheel assembly can run for 100 miles at 50 mph.

A tire and wheel assembly in accordance with the invention will now be described in more detail with reference to FIGS. 1 and 2 of the accompanying drawings, which are schematic cross-sectional views through the ground contacting portion of the assembly in the inflated and deflated states respectively.

Figure 1:
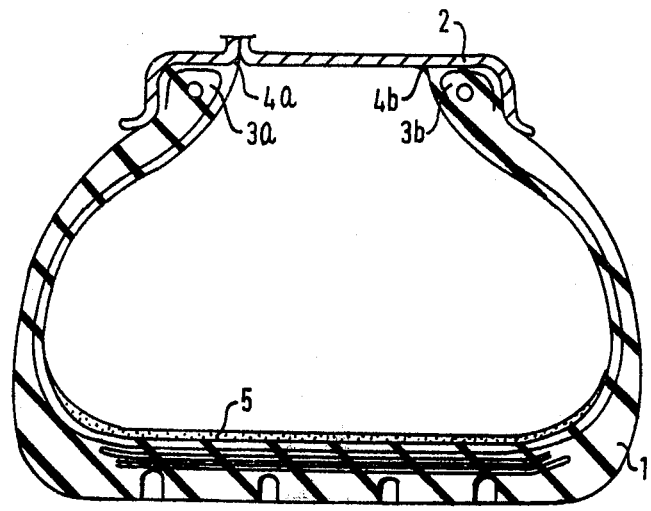
Figure 2:
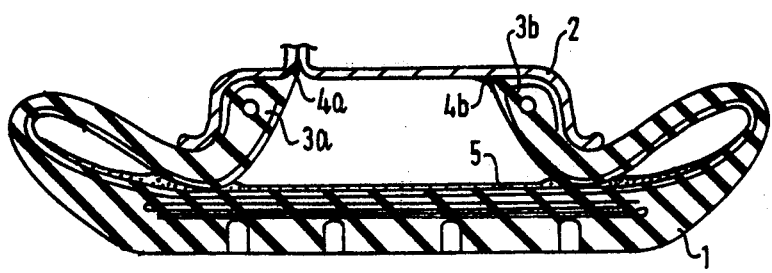

As shown in FIG. 1 the tire and wheel assembly consists of a radial ply pneumatic tire 1 mounted on a split wheel rim 2 the tire tread being wider than the width of the wheel rim between flanges. The split rim 2 has no well but the tire beads 3 are provided with elongated rubber toe portions 4a and 4b moulded in the form of radially inwardly directed rubber annuli of tapering shape. The annulus 4a on the laterally outer bead 3a rests in the notch located at the position of the split in the wheel rim 2 to restrain the bead as described in U.S. application Ser. No. 276,449 filed July 31, 1972 now U.S. Pat. No. 3,857,429 while the annulus 4b on the laterally inner bead 3b is simply stretched over the rim base. A lubricant composition 5, for example as described in the above example, is located in the tire.

Figure 3:
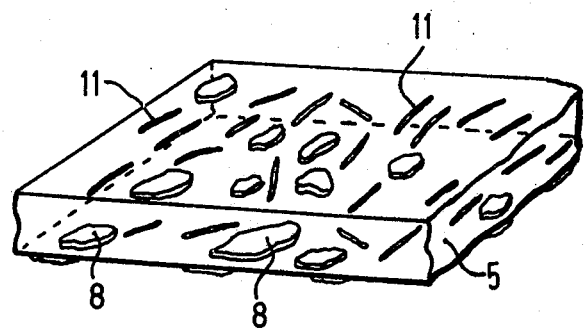
FIG. 3 is an enlarged part of the lubricant layer of FIG. 1.
Figure 4:
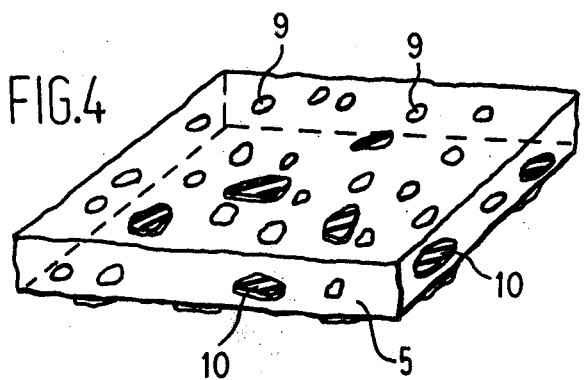
FIG. 4 is similar to FIG. 3 showing an alternative layer.

As shown in FIGS. 3 and 4, the layer 5 of lubricating material comprises pieces of shredded polyethylene 8 (FIG. 3) or pieces of ground polystryene foam 9 (FIG. 4). The layer may also include nylon fibers 11 or particulated rubber 10.

Figure 5:
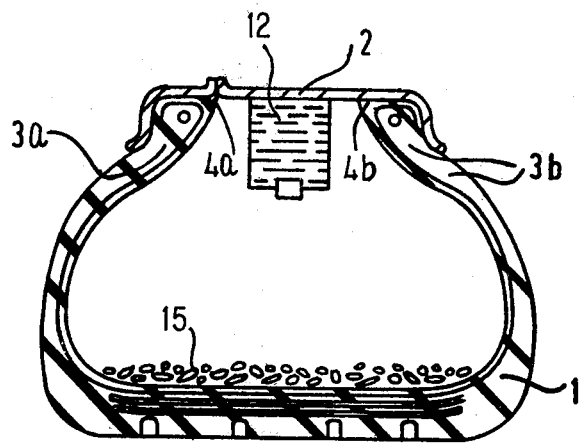
FIG. 5 is similar to FIG. 1 but includes an enclosing means for part of the lubricant.
Figure 6:
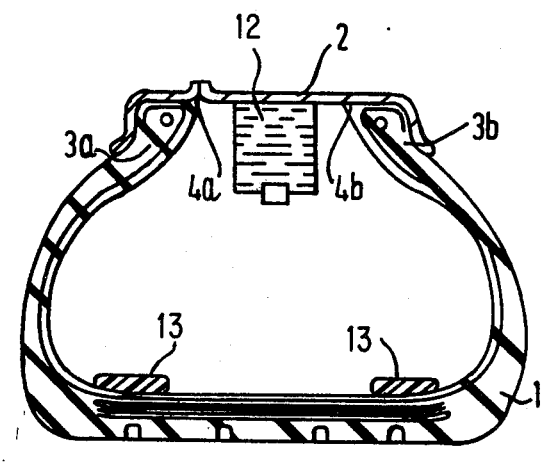
FIG. 6 is similar to FIG. 5 but includes a strip of foamed plastics material.

As shown in FIG. 5, which is a cross section similar to FIG. 1, at least part of the lubricating material may be held in an enclosing means 12 with the puncture sealing material 15 being loose in the inflation chamber. FIG. 6 shows a similar enclosing means 12 with the sealing means comprising a foamed plastics in a strip 13 attached to the interior surface of the tire and being located in a position such that upon deflation of the assembly the material is ground up between contacting interior surfaces of the tire.

Having now described our invention, what we claim is:

1. A pneumatic tire and wheel assembly containing a lubricant composition for lubricating the internal surfaces of the assembly when in use in a deflated or substantially underinflated condition, said lubricant composition including a volatile component to at least partially reinflate the tire and puncture sealing material selected from shredded polyethylene and ground polystryene foam, said material having a density relative to that of the composition in the range 0.7 to 1.3 and comprises particles having a size such that they will just pass through a sieve having 3 mm apertures.

2. An assembly according to claim 1 wherein the shredded polyethylene includes a blend of particle sizes in the range 100 microns to 1.7 mm.

3. An assembly according to claim 1 wherein the shredded polyethylene particles each have a thickness of 75 microns.

4. An assembly according to claim 1 wherein the ground polystyrene foam includes a blend of particle sizes in the range 100 microns to 1.7 mm.

5. An assembly according to claim 1 wherein the puncture sealing material includes nylon fibers.

6. An assembly according to claim 5 wherein the nylon fibers have a length of 1 to 3 mm and a denier in the range 1 to 6.

7. An assembly according to claim 1 wherein the puncture sealing material includes particulated vulcanized rubber.

8. An assembly according to claim 7 wherein the particulated rubber has particle sizes the same as the particle sizes of the particulated plastics material.

9. An assembly according to claim 1 wherein the puncture sealing material is loose in the inflation chamber formed by said assembly, the remainder of the lubricant composition being held in an enclosing means.

10. An assembly according to claim 1 wherein the puncture sealing material is loose within the inflation chamber formed by said assembly together with at least one other ingredient of the lubricant composition.

11. An assembly according to claim 10 wherein the volatile component of the lubricant composition is held in an enclosing means whereby loss of that component is minimized.

12. An assembly according to claim 10 wherein the ingredient loose in the inflation chamber comprises a gel in which the puncture sealing material is carried, said assembly further including an enclosed dilatant ingredient.

13. An assembly according to claim 1 wherein the puncture sealing material together with the lubricant composition are held in an enclosing means.

14. An assembly according to claim 1 wherein the puncture sealing material comprises a foamed plastics material, said material is attached to an interior surface of the tire in strip form, said strip being located in a position such that on deflation of the assembly the material is ground up between contacting interior surfaces of the tire.

15. An assembly according to claim 1 wherein the pneumatic tire has an aspect ratio in the range 50-75%.

16. An assembly according to claim 1 wherein the tire has a tread wider than the distance between the wheel rim flanges.

* * * * *

UNITED STATES PATENT OFFICE
CERTIFICATE OF CORRECTION

PATENT NO. : 3,920,061
DATED : November 18, 1975
INVENTOR(S) : Michael Peter JAPP et al It is certified that error appears in the above-identified patent and that said Letters Patent are hereby corrected as shown below:

Item [22] should read as follows:

--- Item [22]  Filed:  July 30, 1973 ---

Signed and Sealed this sixteenth Day of March 1976

[SEAL]

Attest:

RUTH C. MASON
*Attesting Officer*

C. MARSHALL DANN
*Commissioner of Patents and Trademarks*